(12) United States Patent
Livingston, Jr. et al.

(10) Patent No.: US 9,651,084 B1
(45) Date of Patent: May 16, 2017

(54) SUCTION CUP COVERS

(71) Applicant: Sparrow Product Development, Inc., Shingle Springs, CA (US)

(72) Inventors: Larry Leigh Livingston, Jr., Pilot Hill, CA (US); Derek Carlton Westlund, Placerville, CA (US)

(73) Assignee: SPARROW PRODUCT DEVELOPMENT, INC., Shingle Springs, CA (US)

( * ) Notice: Subject to any disclaimer, the term of this patent is extended or adjusted under 35 U.S.C. 154(b) by 0 days.

(21) Appl. No.: 15/375,107

(22) Filed: Dec. 11, 2016

Related U.S. Application Data

(60) Provisional application No. 62/410,692, filed on Oct. 20, 2016, provisional application No. 62/423,497, filed on Nov. 17, 2016.

(51) Int. Cl.
*F16B 47/00* (2006.01)
*G01M 3/02* (2006.01)
*A47G 1/17* (2006.01)

(52) U.S. Cl.
CPC .............. *F16B 47/00* (2013.01); *G01M 3/02* (2013.01); *A47G 1/17* (2013.01)

(58) Field of Classification Search
USPC ......... 248/205.5, 205.6, 205.7, 205.9, 206.1, 248/206.2, 206.3, 683, 467
See application file for complete search history.

(56) References Cited

U.S. PATENT DOCUMENTS

| | | | |
|---|---|---|---|
| 2,404,412 A * | 7/1946 | Stephens | F16B 47/00 248/205.9 |
| 5,685,513 A * | 11/1997 | Tsukushi | B25B 11/005 248/205.9 |
| 7,690,609 B2 * | 4/2010 | Akai | F16B 47/00 248/205.5 |
| 2009/0309283 A1 * | 12/2009 | Blick | B23Q 1/032 269/259 |

* cited by examiner

*Primary Examiner* — Alfred Wujciak
(74) *Attorney, Agent, or Firm* — Manuel de la Cerra

(57) ABSTRACT

A suction cup apparatus is disclosed that includes a suction cup and a suction cup cover. The suction cup has an outer sealing edge and can be placed under vacuum. The cover has a solid suction cup cover surface and a suction cup cover wall extending away from this surface. The suction cup cover wall is constructed to circumscribe the outer sealing edge, and the suction cup cover wall and solid suction cup cover surface are constructed to elastically deform under a pulling force. The suction cup cover is further constructed to fit around the sealing edge when subjected to the pulling force and to form an airtight seal between the suction cup and suction cup cover when the pulling force is withdrawn.

18 Claims, 20 Drawing Sheets

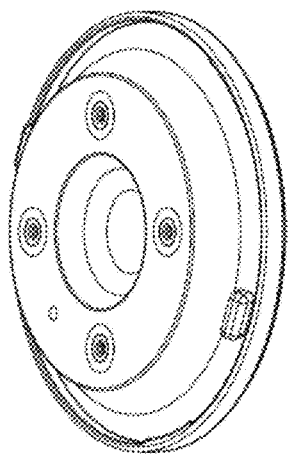 
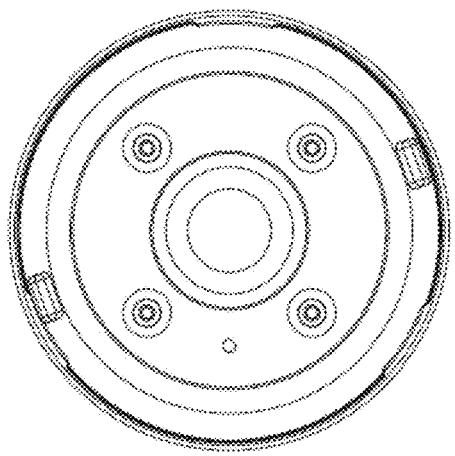 
FIG. 15  FIG. 16
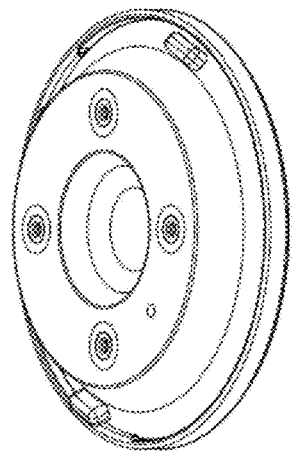 

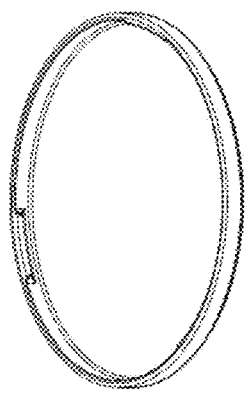
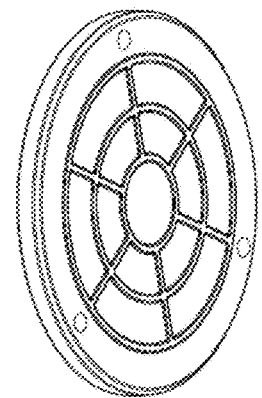
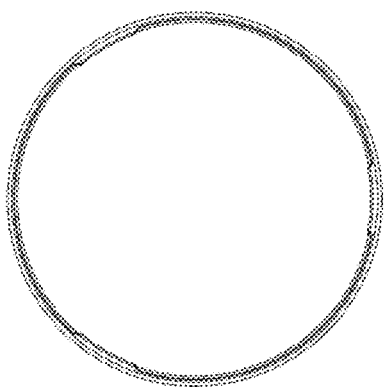
FIG. 20
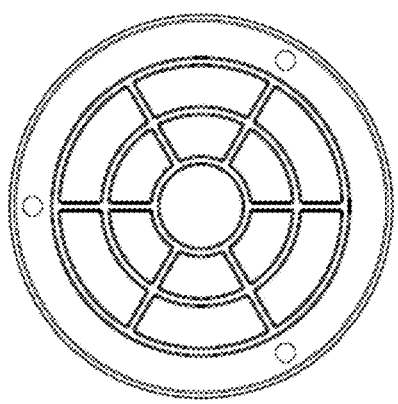
FIG. 21
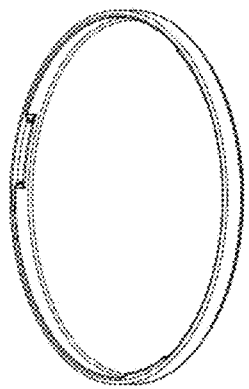
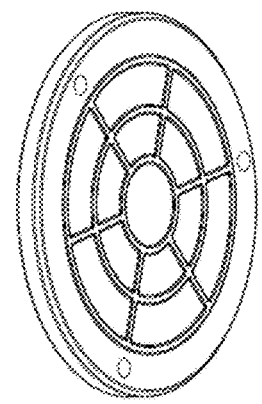

US 9,651,084 B1

SUCTION CUP COVERS

1.0 CROSS-REFERENCE TO RELATED APPLICATIONS

This application claims priority as a non-provisional of U.S. Patent Application No. 62/410,692, entitled CUP COVERS, filed on Oct. 20, 2016, and U.S. Patent Application No. 62/423,497, entitled SUCTION CUP COVERS, filed on Nov. 11, 2016, and those patent applications are incorporated herein in their entireties.

2.0 FIELD OF THE INVENTION

This invention relates to tools using suction cups. More particularly, this invention relates to covers used to protect the suction cups and to confirm that the suction cups are operating correctly.

3.0 BACKGROUND

The demand for solid-surface countertops such as granite, marble, engineered stone, and Corian® has steadily risen over the past decade. As the demand for solid-surface countertops, vanities, tub decks, fireplace mantles and hearths continues to grow, it becomes more imperative for solid-surface fabrication companies to work faster, without sacrificing quality, in order to meet this demand.

In working with solid surfaces, it is often desirable to join two or more pieces of material together. For example, in U.S. Pat. No. D644497 issued on Sep. 6, 2011, a solid-surface seaming apparatus is claimed. FIG. 1A is a drawing from the '497 patent, and the seam-setter apparatus 10 uses two suction cups 15, 25, which are operated by hand pumps 20, 30. The user of this apparatus lays down two pieces of a solid-surface material, and at the edge of each piece applies adhesive. The goal is to bring both pieces together to form a stable, strong and level seam. To do this, the user places the first suction cup 15 on one piece of a solid-surface material and the second suction cup 25 on the second piece of solid-surface material, and then the user activates both hand pumps 20, 30. It should be noted that some seam setters have an automated pump, in which case the user would activate the pump to draw a vacuum in the suction cups 15, 25. Once the vacuum is drawn, the user turns the knob 35, mounted on a threaded rod 37, which draws the suction cups 15, 25 linearly closer to each other, thereby closing the seam between the two pieces of the solid-surface material. Then the user turns the leveling knobs (38a, 38b) that are mounted to threaded rods, which push down near the seam until both solid-surface pieces are at the same level. The seam-setter apparatus 10 is left on the two pieces of the solid-surface material until the adhesive cures.

Suction cups are used to strengthen and carry fragile material. As in the example shown in FIG. 1B, multiple suction cups are connected to a longer frame or rigid beam that keeps fragile material from flexing and/or breaking during transport and general handling. In other examples, the suction cup may be connected to a crane-type apparatus, such that suction can be drawn on the cups and the operator can activate the crane to lift and position the material. As another example, the suction cup may be connected to a handle as shown in FIG. 1C or as shown in U.S. Pat. No. 3,240,525 issued to Wood on Dec. 13, 1963, incorporated herein by reference; such an apparatus allows the user the move the material into more precise placement.

FIG. 2, which is a new design by the same inventor of the present invention, illustrates a suction cup 40 removed from the device. The cup has a port 45 formed into the pliable suction surface 50, wherein the port 45 is connected to the pump, such that the cup can form a vacuum upon activation of the pump.

Because suction cups are often used in dirty environments that are constantly polluted by polishing and grinding, it is important to cover the cups to prevent damage to the pliable surface 50 and the sealing edge 52 of the suction cup. Such damage can render the suction cup inoperable by causing air leaks that prevent a proper vacuum from forming. This in turn can cause the suction cup to fail while in use, damaging the material, or worse, injuring the user. The cover currently used for suction cups is shown in FIG. 3. The suction cup 40 is shown connected to a larger apparatus 55 (which may be a seam setter, a stiffening device, a crane, etc.). A cover 60 covers the pliable surface 50 and the sealing edge 52 of the suction cup 40. This cover 60 snaps over the edge of the suction cup 40 and requires the user to bend the rigid plastic tab 65. This is shown in FIGS. 4 and 5. Once the hard plastic tab 65 is bent, the suction cup 40 can be slipped under the tab 65, as shown in FIGS. 6 and 7. Because the previous cup covers 60 have been made from rigid plastics, they require holes 70 in the bottom (see FIG. 7) in order for the two halves of the injection mold to create the top lip edge that snaps over the rubber edge. Also, the cover 60 has a gap 72 around the edge of the suction cup.

Unfortunately, the prior art design has several problems. First, the hole 70 in the bottom does not protect the sealing edge 52 at that spot as shown in FIG. 8, allowing dust and debris to enter and damage the suction cup. The hole 70 can also damage the sealing edge 52 if the rigid plastic cover 60 and/or tab 65 has a sharp edge. Also, the hole 70 can deform the sealing edge 52 if the sealing edge rests on the hole 70 with any weight; such a deformation could cause tool failure. The hard plastic tab 65 eventually breaks from bending it to get the cover 60 on the cup, as shown in FIG. 9 where the plastic has plastically deformed and shows discoloration (at position 66) from stress. Having to bend the hard plastic tab 65 is not easy (it takes time and effort), and if the hard plastic tab 65 is molded thinner to make this easier, then it will have a greater tendency to break. Also, many vacuum cups have a vacuum release "nub" 75 that juts away from the vacuum cup (see FIG. 10). This nub 75 is often in the way when trying to attach the cover 60, such that the cover 60 needs to be "clocked" in the proper orientation before putting it on, again wasting time. The gap 72 also allows for dust, debris and grime to enter into/onto the suction cup, which degrades the suction cup material and lowers the life expectancy of the suction cup.

What is therefore needed is a suction cup cover that overcomes these deficiencies and provides full protection of the sealing edge of the suction cup.

4.0 SUMMARY

The present invention provides an elegant solution to the needs described above and offers numerous additional benefits and advantages, as will be apparent to persons of skill in the art. In one aspect, a suction cup apparatus is disclosed and claimed that includes a suction cup and a suction cup cover. The suction cup is made from a resilient material, and includes a pliable suction surface, an outer sealing edge and a vacuum port constructed to allow air to be drawn from the suction cup. The cover has a solid suction cup cover surface and a suction cup cover wall extending away from this surface. The suction cup cover wall is constructed to circumscribe the outer sealing edge, and the suction cup cover wall and solid suction cup cover surface are constructed to elastically deform under a pulling force. The suction cup cover is further constructed to fit around the sealing edge when subjected to the pulling force and to form an airtight seal between the suction cup and the suction cup cover when the pulling force is withdrawn.

The suction cup may include an outer wall extending away from the sealing edge and a top surface extending away from the outer wall. The suction cup cover wall may include an overhang constructed to extend over the top surface when the cover is attached. This overhang may be a plurality of overhangs or may extend the entire length of the suction cup cover wall. The overhang may form a dust-proof seal with the top surface.

In other embodiments, the solid suction cup cover surface can have strengthening ribs and foot nubs. The suction cup can be connected to a manually-operated vacuum pump or to a power-actuated vacuum pump.

The apparatus may further include a frame that includes a handle, a crane and/or a threaded rod linear structure. The suction cup cover may be constructed to withstand at least 70 kPa of vacuum applied through the vacuum port when the suction cup cover is attached to the suction cup. The deflection of the suction cup cover may be less than 10% of a chord length (defined as the distance from one suction cup cover wall to another portion of the wall on the opposite side).

A method is also claimed and disclosed for applying the suction cup cover to a suction cup, and testing the suction cup for failure.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

5.0 BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

FIG. 1A is an isometric view of a seam setter from U.S. Pat. No. D644497.

FIG. 15 illustrates a top view and top perspective views of the suction cup attached to the cup cover.

FIG. 16 illustrates side views of the suction cup attached to the cup cover.

FIG. 20 illustrates a top view and top perspective views of the cup cover.

FIG. 21 illustrates a bottom view and bottom perspective views of the cup cover.

6.0 DETAILED DESCRIPTION

Figure 1A:
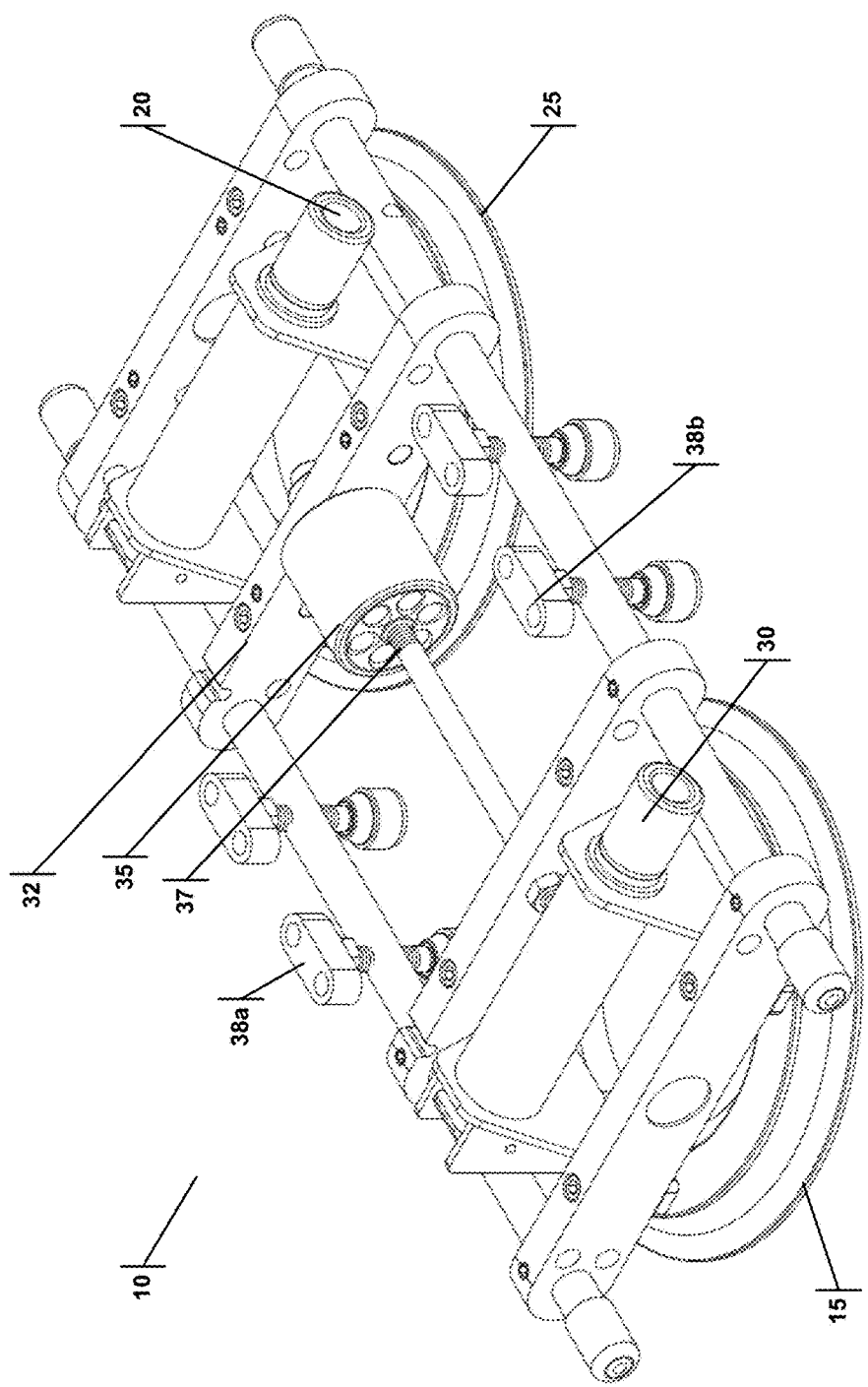
FIG. 1B is an isometric view of several suction cups connected by a frame, wherein the suction cups are attached to a slab of material.
FIG. 1C is an isometric view of a suction cup connected to a handle.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

The following list of example features corresponds with FIGS. 1-25 and is provided for ease of reference, where like reference numerals designate corresponding features throughout the specification and figures:

Seam setter apparatus 10
First suction cup 15
First hand pump 20
Second suction cup 25
Second hand pump 30
Frame 32
Knob 35
Threaded rod 37
Leveling knobs 38a, 38b
Suction Cup 40
Port 45
Pliable suction surface 50
Sealing edge 52
Larger apparatus using a suction cup 55
Prior art cover 60
Rigid plastic tab 65
Stress discoloration 66
Hole in cover 70
Gap in the cover 72
Protruding nub 75
Suction cup cover 80
Solid suction cup cover surface 85
Suction cup cover wall 90
Sealing edge outer wall 92
Sealing edge top surface 95
Suction cup cover wall overhang 100
Strengthening ribs 105
Foot nub 110
Pulling force 115
Chord 120
Deflection 125

FIGS. 1 through 10 show a prior art suction cup and cover, previously discussed above. The drawbacks of the prior art design are overcome by a novel suction cup apparatus, shown in FIGS. 11A through 22.

Figure 11A:
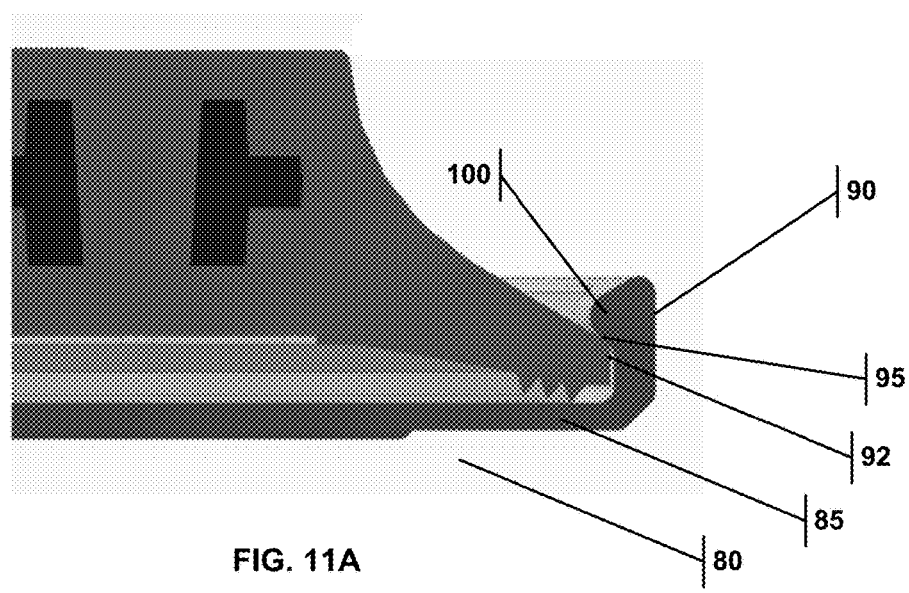
FIG. 11A illustrates a cross-sectional view of the novel cup cover installed on a suction cup.
Figure 11B:
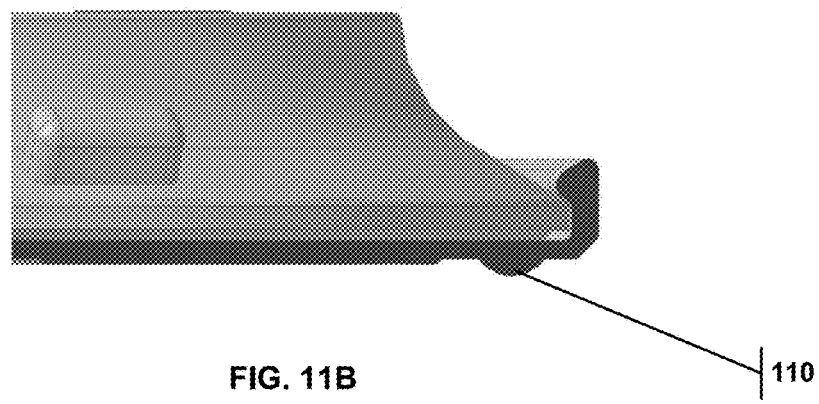
FIG. 11B illustrates a cross-sectional view of the novel cup cover installed on a suction cup.
Figure 11C:
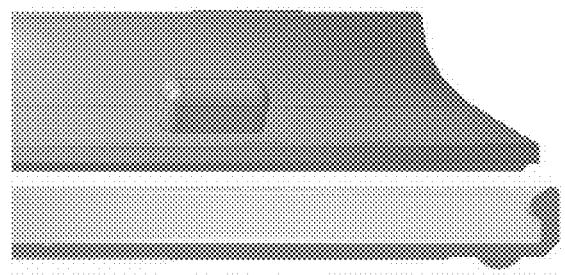
FIG. 11C illustrates a cross-sectional view of the novel cup cover and the suction cup.

FIGS. 11A-C illustrate a cross-sectional view of a novel suction cup cover 80 installed on a suction cup. As shown in FIG. 11A, the suction cup cover 80 has a solid suction cup cover surface 85 constructed to cover the suction cup. The suction cup has a sealing edge outer wall 92 extending away from the sealing edge, and a top surface 95 extending away from the outer wall. A suction cup cover wall 90 extends away from the solid suction cup cover surface 85 and is constructed to circumscribe the outer sealing edge of the suction cup. The cover wall 90 has an overhang structure 100, which may be a plurality of overhang structures, constructed to extend over the sealing edge top surface 95 when cover 80 is attached to the suction cup. This makes the cover easy to attach, and creates a dust-proof seal with the top surface, keeping out debris which could harm the sealing edge. The cup cover also protects the sealing edge of the suction cup when the cup is not in use, avoiding damage that causes leaks which may result in cup failure or safety hazards.

FIG. 11B depicts a foot nub 110 in the cup cover 80. The foot nub or nubs protrude below the cover surface 85 and allow the rest of the cover to remain clean when placed on a dirty work surface. The foot nub or nubs may also be positioned to align with the overhang or overhangs, providing tactile feedback for the user to know where to press when attaching the cover to the cup.

FIG. 11C provides a view of the suction cup cover detached from the suction cup.

Figure 12A:
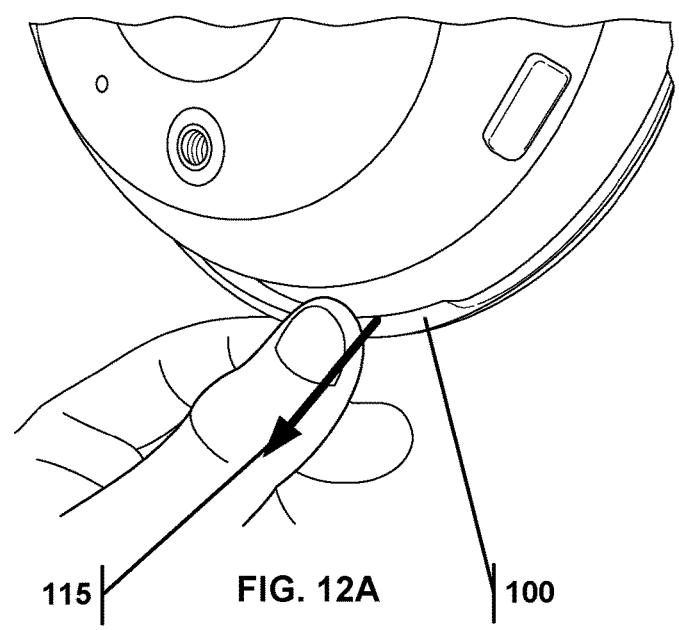
FIG. 12A illustrates the installation of the novel cup cover on a suction cup.
Figure 12B:
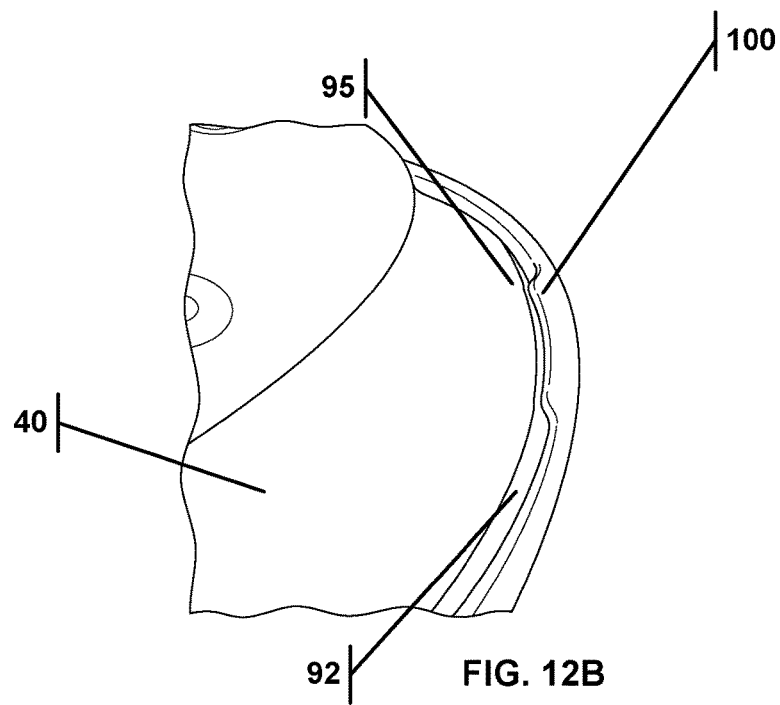
FIG. 12B illustrates a top perspective view of the novel cup cover installed on a suction cup.

FIG. 12A depicts the installation of the novel cup cover on a suction cup, while FIG. 12B shows the cup cover installed on the cup 40. To install the cover, a user applies a pulling force 115 in the direction of the arrow, causing the cover to elastically deform or flex. This allows the overhang structure 100 to extend over the sealing edge top surface 95 and flex back to its original position when the pulling force is withdrawn, thus forming a seal between the cover and the sealing edge outer wall 92. The overhang structure 100 is of a height that will not interfere with the protruding nub on the suction cup, so that no specific rotational orientation is required when attaching the cover.

Figure 13A:
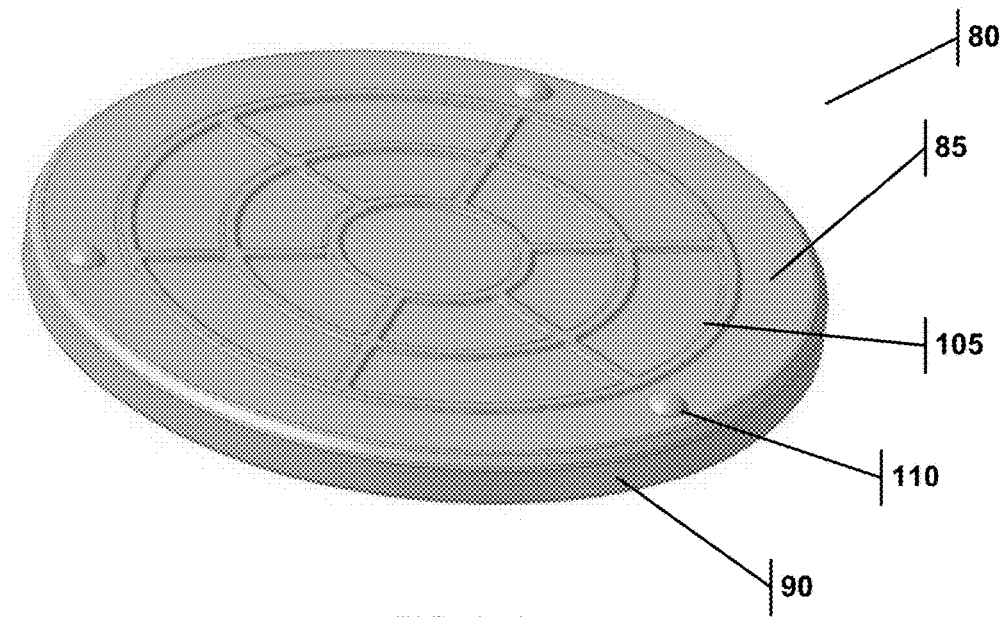
FIG. 13A illustrates a bottom perspective view of the novel suction cup cover.
Figure 13B:
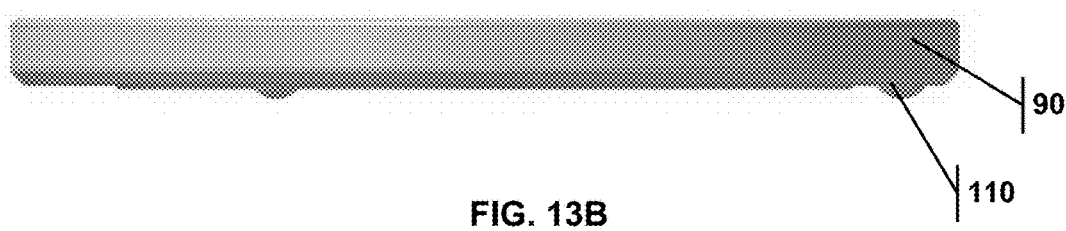
FIG. 13B illustrates a side view of the novel suction cup cover.
Figure 13C:
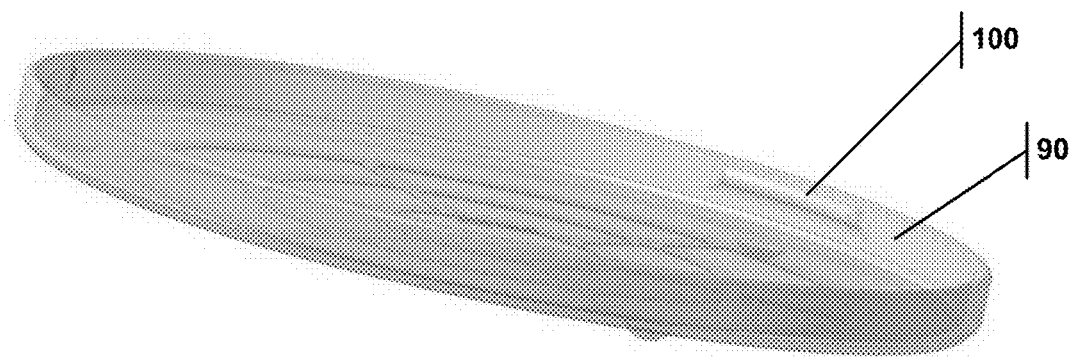
FIG. 13C illustrates a top perspective view of the novel suction cup cover, wherein the cup cover is made from a transparent material.

FIG. 13A-C further illustrate the suction cup cover 80. FIG. 13A particularly shows an exemplary pattern of optional strengthening ribs 105, which add rigidity to the cover surface 85 while reducing its required thickness. The preferred thickness for molded Thermoplastic polyurethane (TPU) plastic is 0.08" to 0.20" for diameters 2" to 18". This preferred thickness can be reduced by incorporating strengthening ribs. The optimal diameter-to-thickness ratio is less than 80:1.

The suction cup cover 80 may be manufactured of any suitable resilient material. TPU is a preferred composition, but any thermoplastic elastomer having similar properties of elasticity, flexibility and resilience could be used, as will be apparent to one skilled in the art. The material need only be able to flex sufficiently to be demolded from an injection mold when overhangs are present. TPU, with qualities of rubber and plastic, is often used to make cell phone and tablet covers, where the cover needs to snap over and around the edges of the device. The rigidity of materials like rubber or plastic are measured in durometers, a measurement of the hardness of a material. Materials with durometers of 50, 60, 70, 80, and 90 Shore A were tested and all were found to flex sufficiently to be demolded from an injection mold. The preferred material hardness, however, was found to be 90

Shore A because it provides the required flexibility while being sufficiently hard to withstand the rigors of field use.

As shown in FIG. 13B, the foot nubs 110 extend below the ribs 105, ensuring that only the nubs 110 contact a dirty surface onto which the cover may be placed. FIG. 13C shows the cup cover optionally made from a transparent material.

Figure 14:
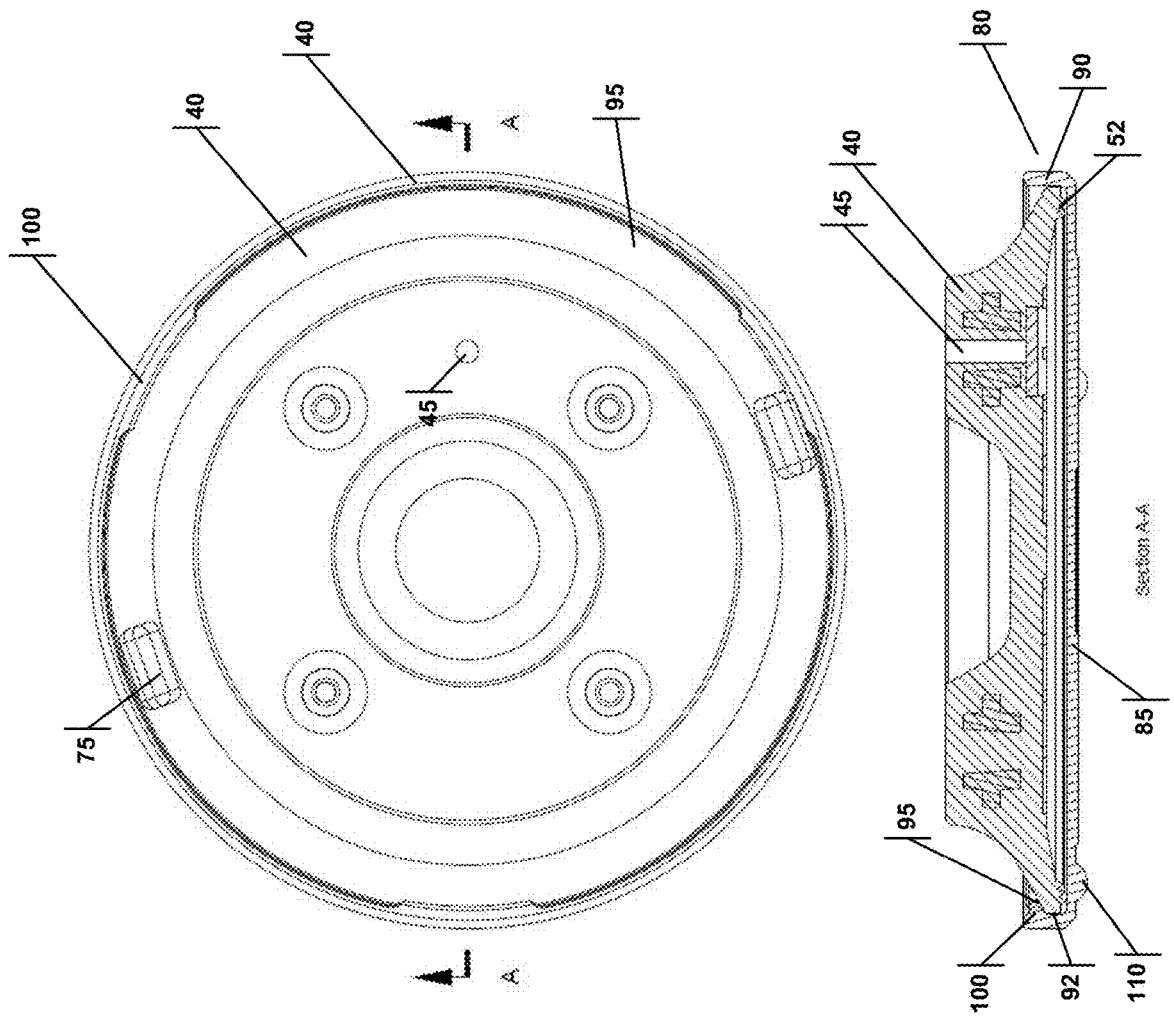
FIG. 14 illustrates the top view of the suction cup attached to the cup cover and a cross-sectional view of the same.

FIG. 14 illustrates the suction cup 40 attached to the cup cover 80. The suction cup 40, which is formed of a resilient material such as rubber or silicone, has a pliable suction surface with an outer sealing edge 52 and a vacuum port 45. The suction cup cover 80 is constructed to fit around the sealing edge 52 of the suction cup 40 when subjected to the pulling force and to form an airtight seal with the suction cup 40 when the pulling force is withdrawn.

Air can be withdrawn from the suction cup 40 using a manually-actuated or power-actuated pump connected to the vacuum port 45. The suction cup cover 80 is constructed to withstand at least 70 kPa (kilopascals) of vacuum applied through the vacuum port 45 when the suction cup cover 80 is attached to the suction cup 40. Typical vacuum pressures used in the solid-surface fabrication industry, and common for industrial pumps, are about 70 kPa, although some pumps operate at up to 88 kPa, in which case the suction cup cover 80 should be constructed to withstand the higher vacuum pressure.

Figure 17:
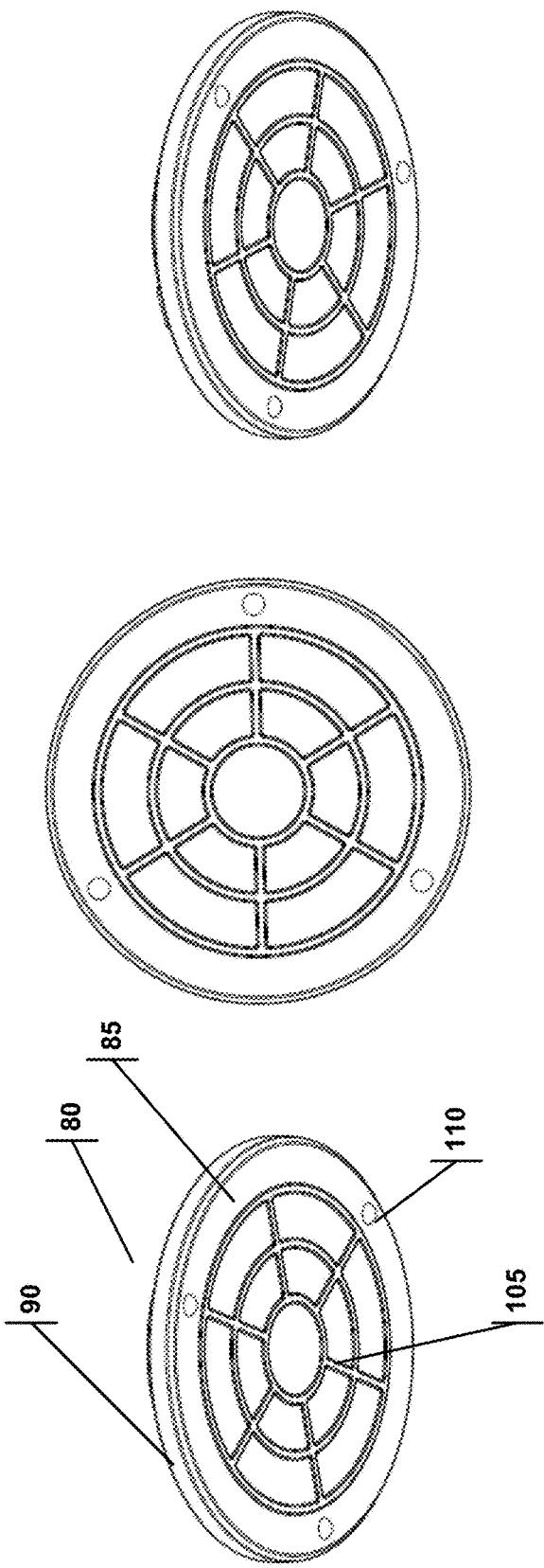
FIG. 17 illustrates a bottom view and bottom perspective views of the suction cup attached to the cup cover.
Figure 18:
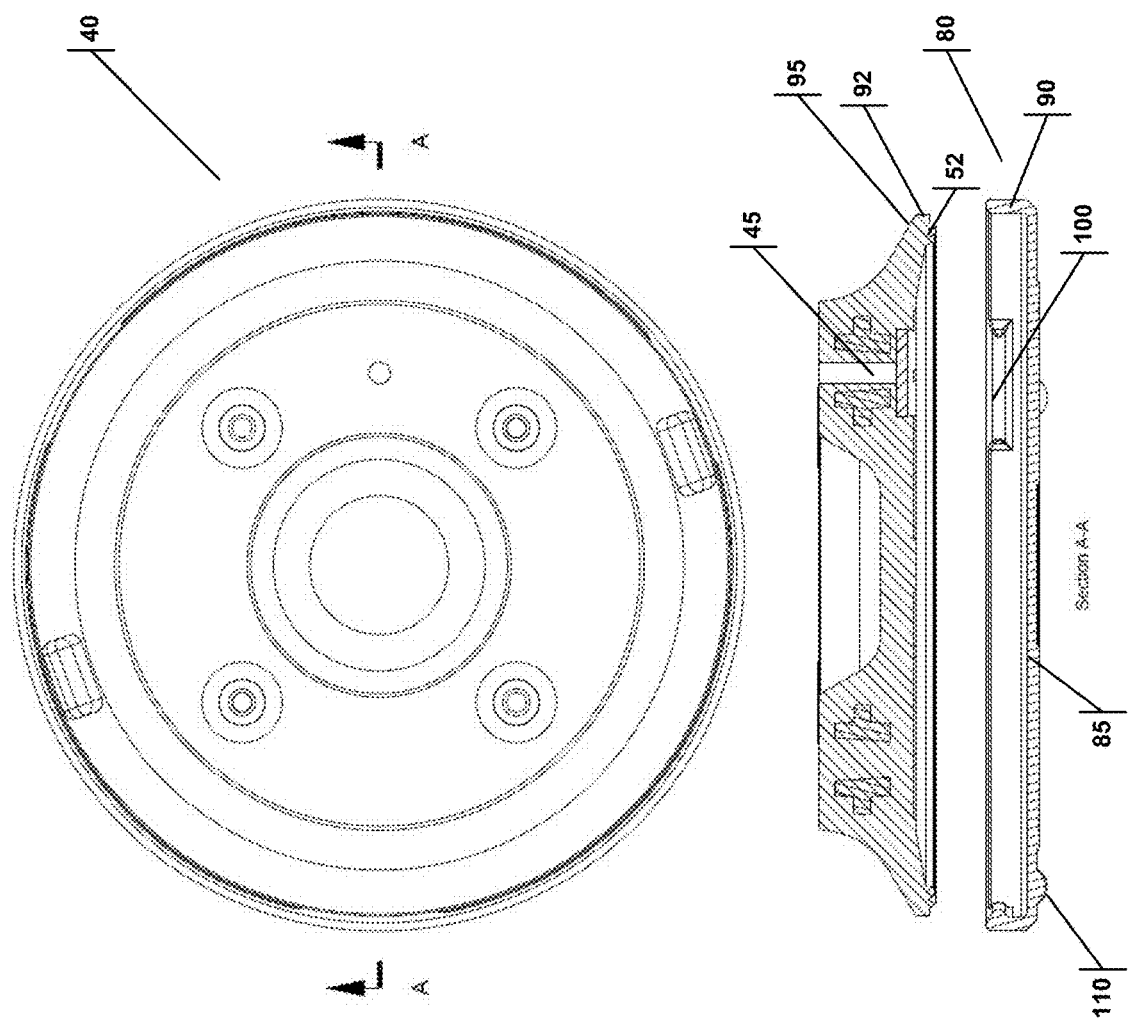
FIG. 18 illustrates the top view of the suction cup detached from the cup cover and a cross-sectional view of the same.
Figure 19:
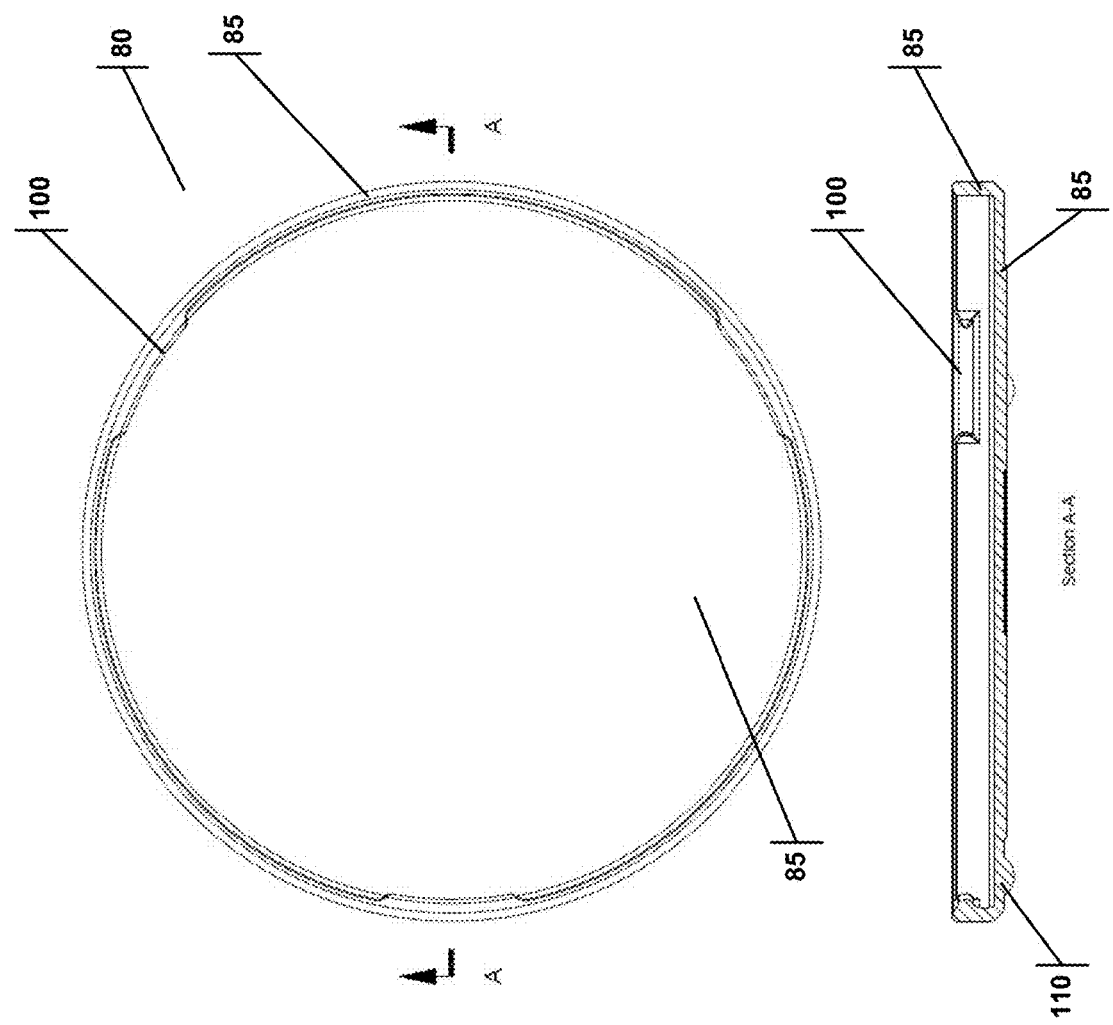
FIG. 19 illustrates the top view of the cup cover and a cross-sectional view of the same.

FIGS. 15, 16 and 17 provide additional views of the suction cup attached to the suction cup cover. The suction cup is shown detached from the cup cover in FIG. 18. FIGS. 19, 20 and 21 further illustrate the cup cover.

Figure 22:
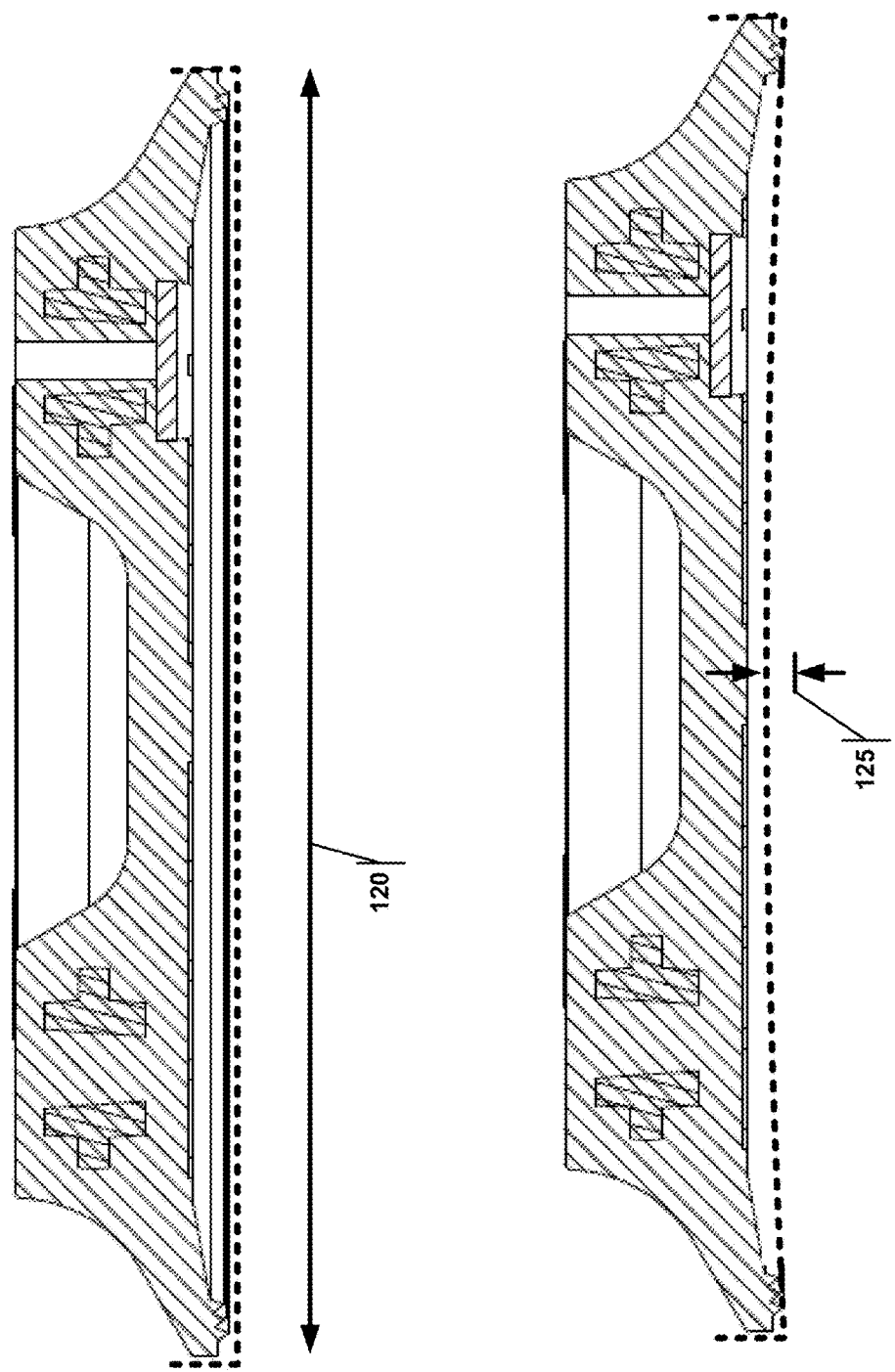
FIG. 22 illustrates the deflection of the cup cover when exposed to a vacuum within the suction cup.

FIG. 22 depicts the deflection 125 of the cup cover when exposed to a vacuum within the suction cup. The solid suction cup cover surface defines a chord 120 that begins at one portion of the solid suction cup wall and ends at a second portion of the wall that is on the opposite side of the solid suction cup cover surface. The solid suction cup cover surface defines a plane when the suction cup is not under a vacuum. When the suction cup cover is attached to the suction cup and 90 kPa is applied through the vacuum port, the solid suction cup cover surface experiences a deflection 125 which is less than 10% of the length of the chord 120. At lower applied pressures, the surface will deflect even less.

Figure 1B:
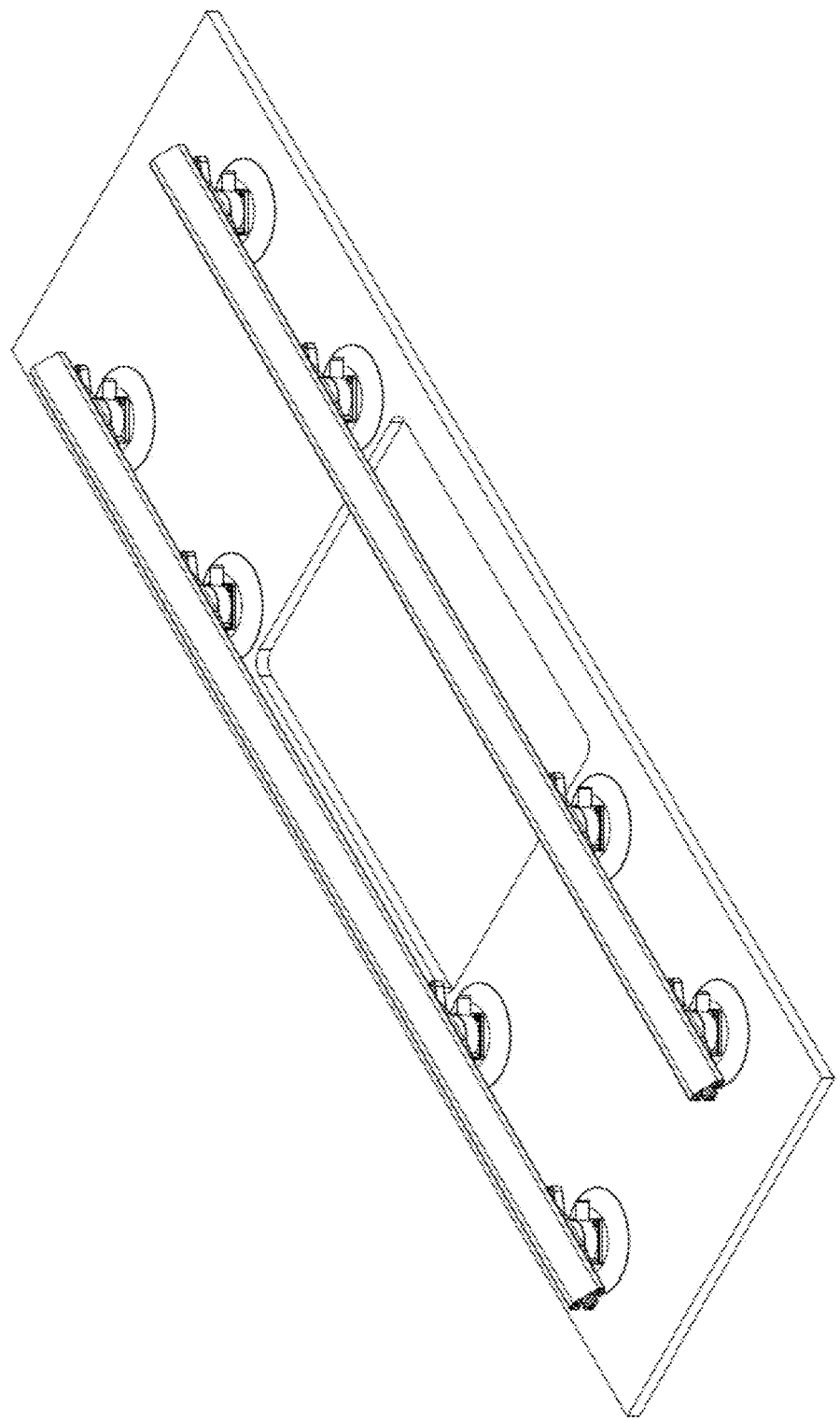
Figure 1C:
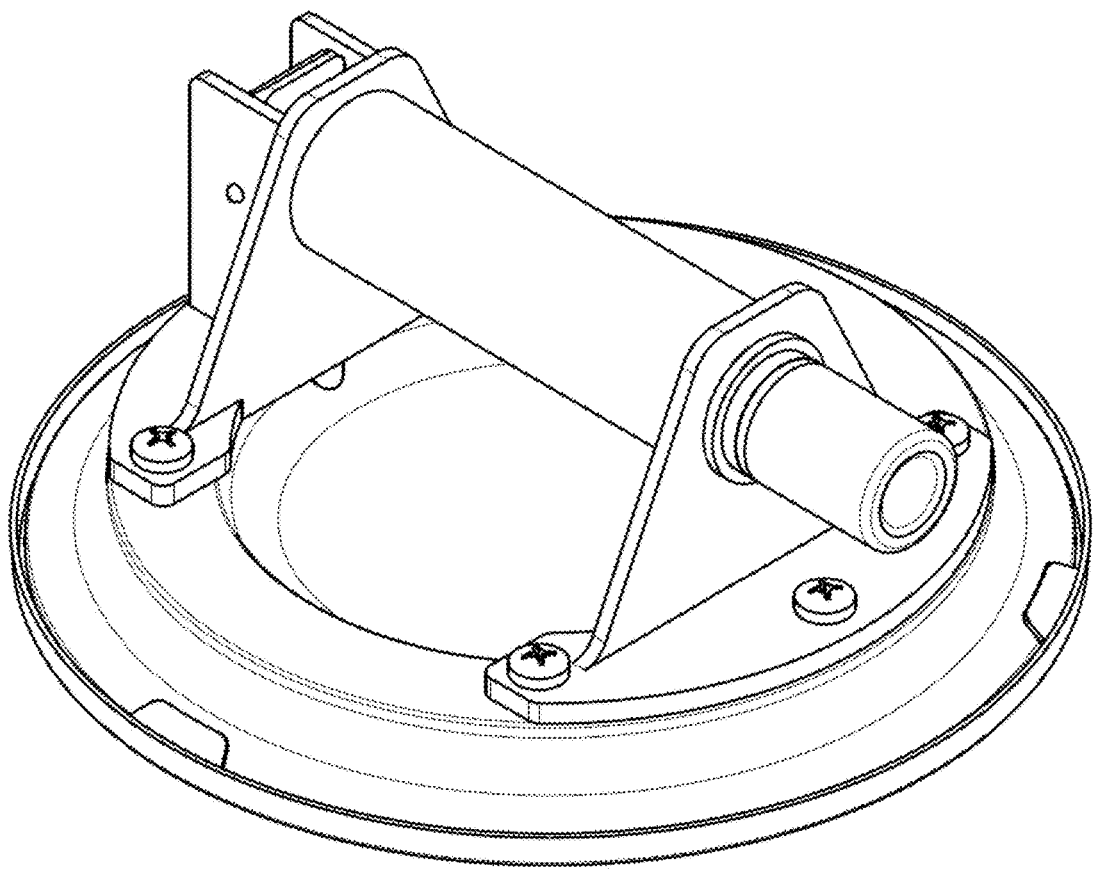
Figure 2:
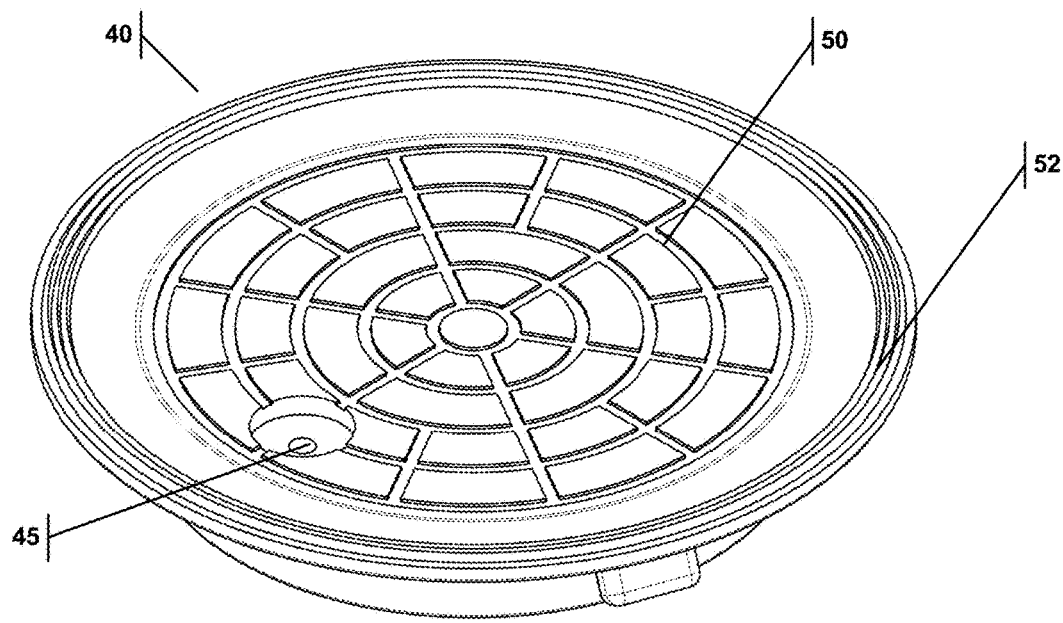
FIG. 2 is an isometric view of a suction cup.
Figure 3:
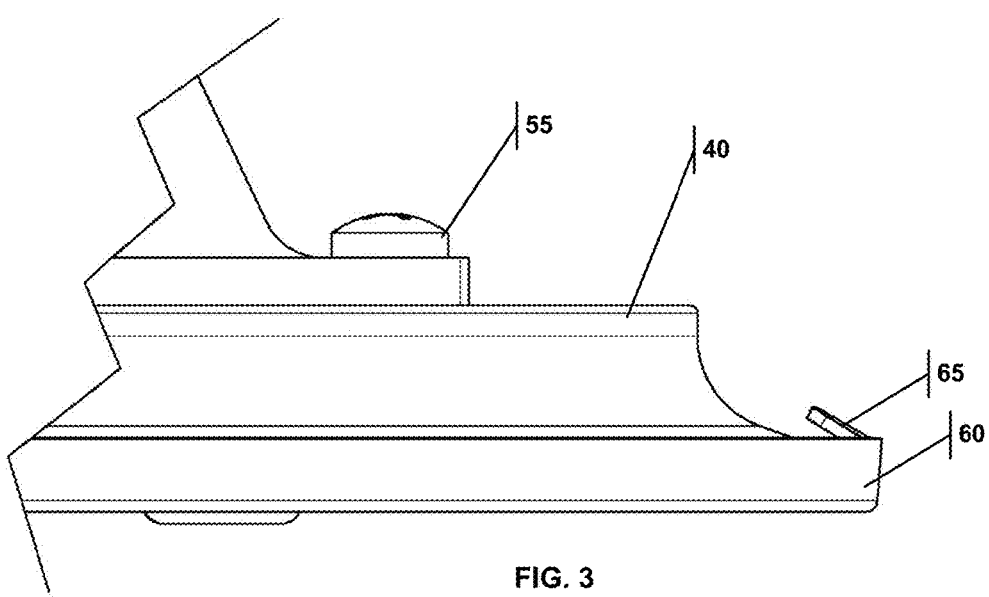
FIG. 3 is a side view of a suction cup connected to a larger apparatus, with a prior art cup cover attached thereto.
Figure 4:
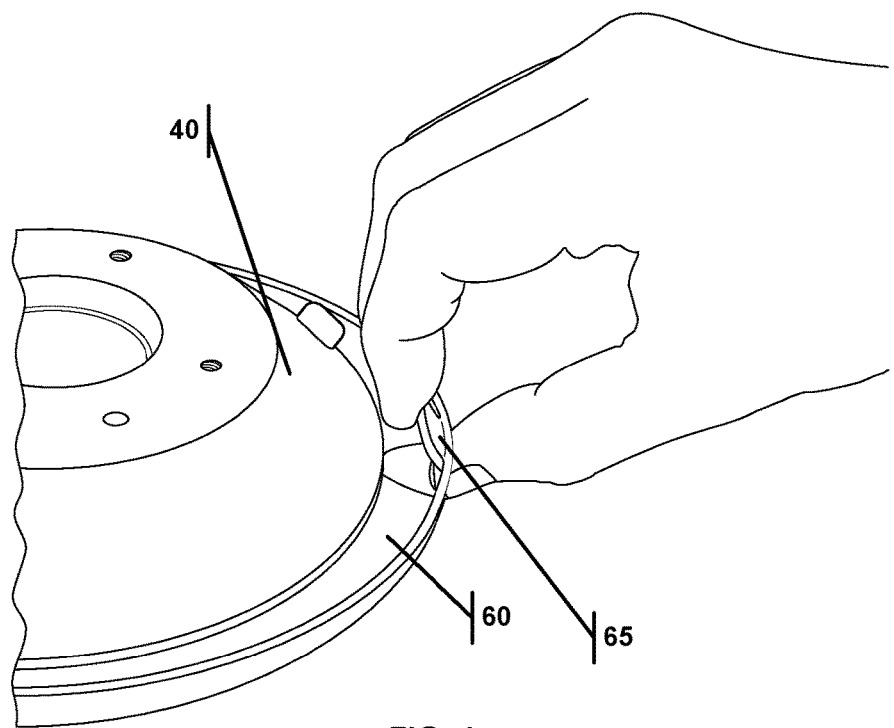
FIG. 4 illustrates the installation of the prior art cup cover onto the suction cup.
Figure 5:
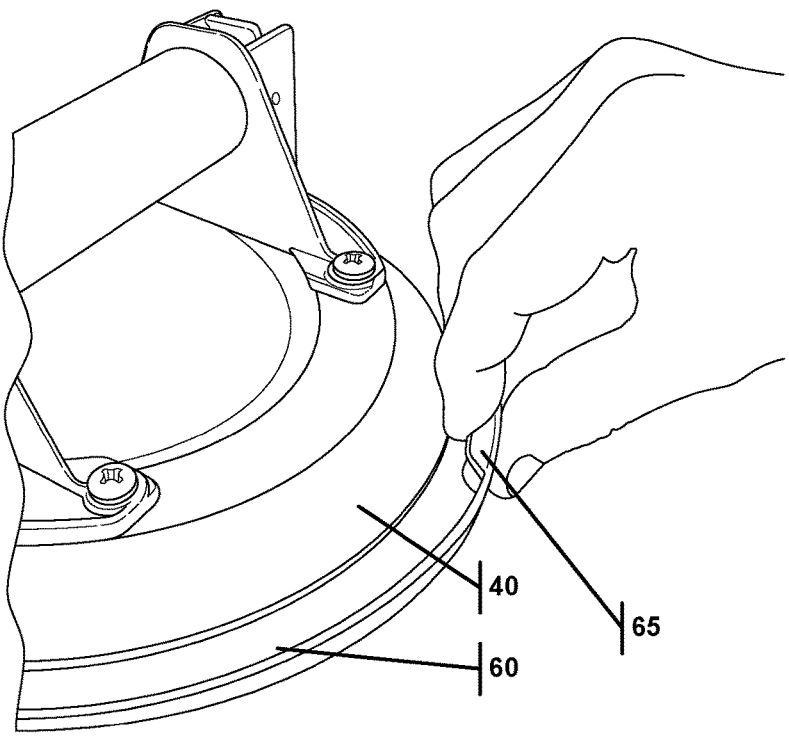
FIG. 5 illustrates the installation of the prior art cup cover onto the suction cup.
Figure 6:
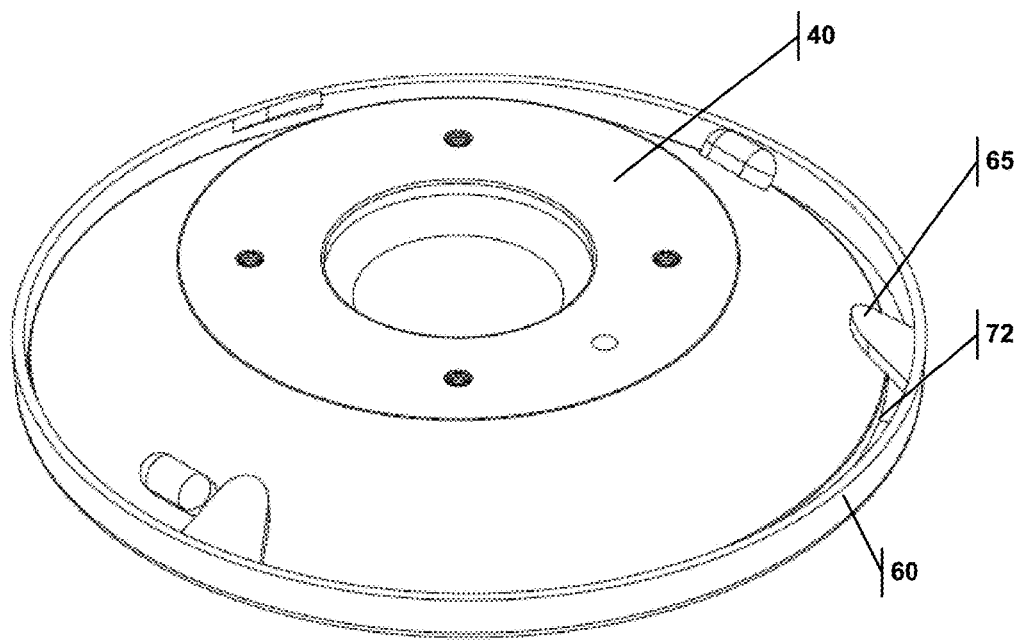
FIG. 6 illustrates a top perspective view of the prior art cup cover installed over the suction cup.
Figure 7:
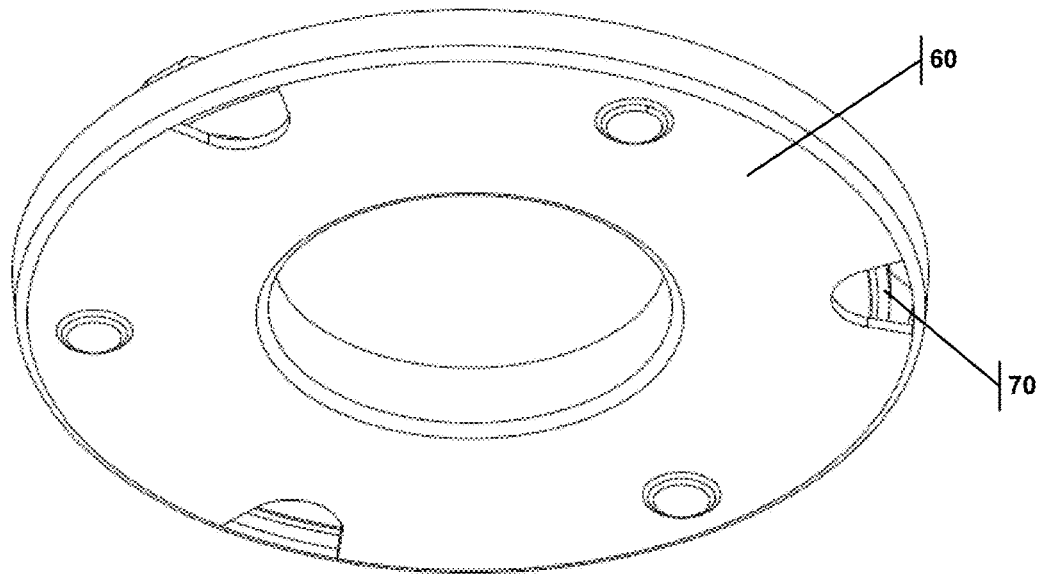
FIG. 7 illustrates a bottom perspective view of the prior art cup cover installed over the suction cup.
Figure 9:
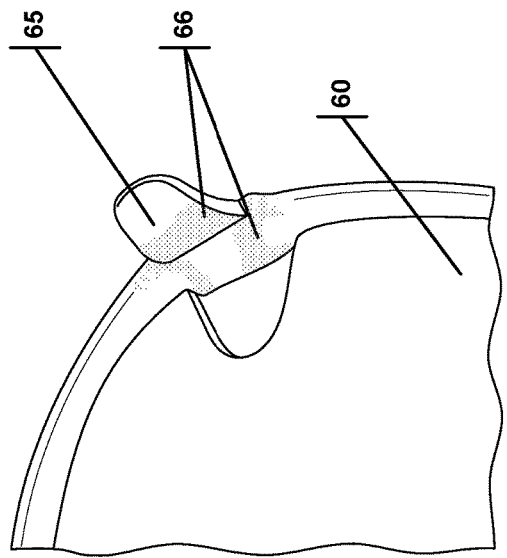
FIG. 9 illustrates a damaged hard plastic tab of the prior art cup cover.
Figure 10:
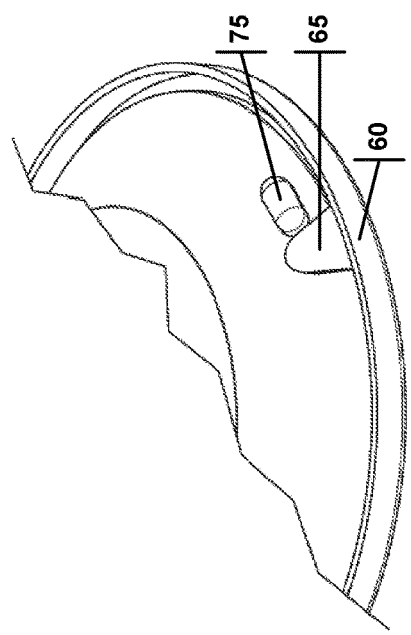
FIG. 10 illustrates a top perspective view of the prior art cup cover installed over the suction cup, wherein the suction cup has a protruding nub.
Figure 8:
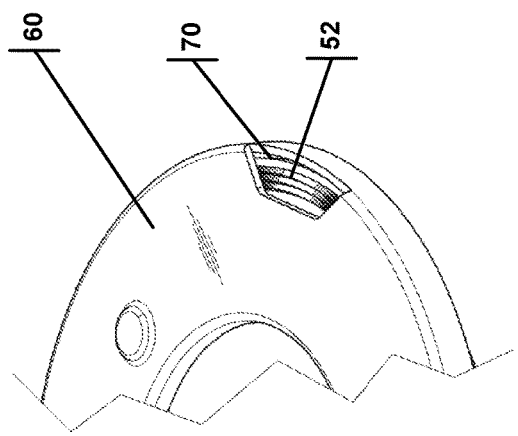
FIG. 8 illustrates a bottom perspective view of the prior art cup cover installed over the suction cup, further showing the hole and the sealing edge of the suction cup.

A frame may be connected to the suction cup, as described previously. The frame may be a rigid beam with multiple suction cups for keeping fragile material from flexing and/or breaking during transport and general handling, as shown in FIG. 1B. The frame may be a manipulation structure, such as a handle (FIG. 1C), a crane, or a threaded-rod linear-motion device (FIG. 1A), constructed to move the suction cup.

Figure 23:
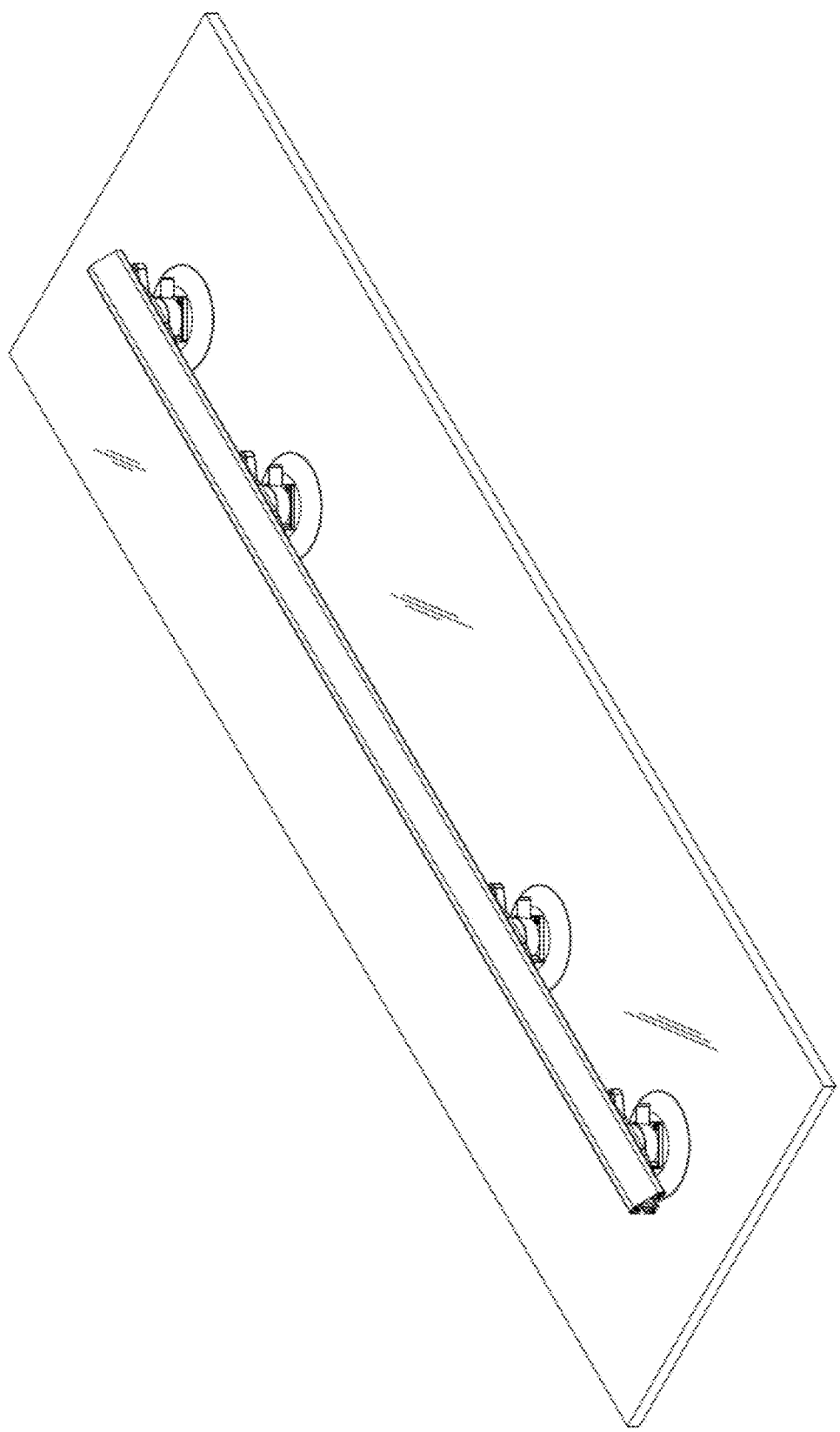
FIG. 23 illustrates a setup to test the suction power and operation of multiple suction cups.
Figure 24:
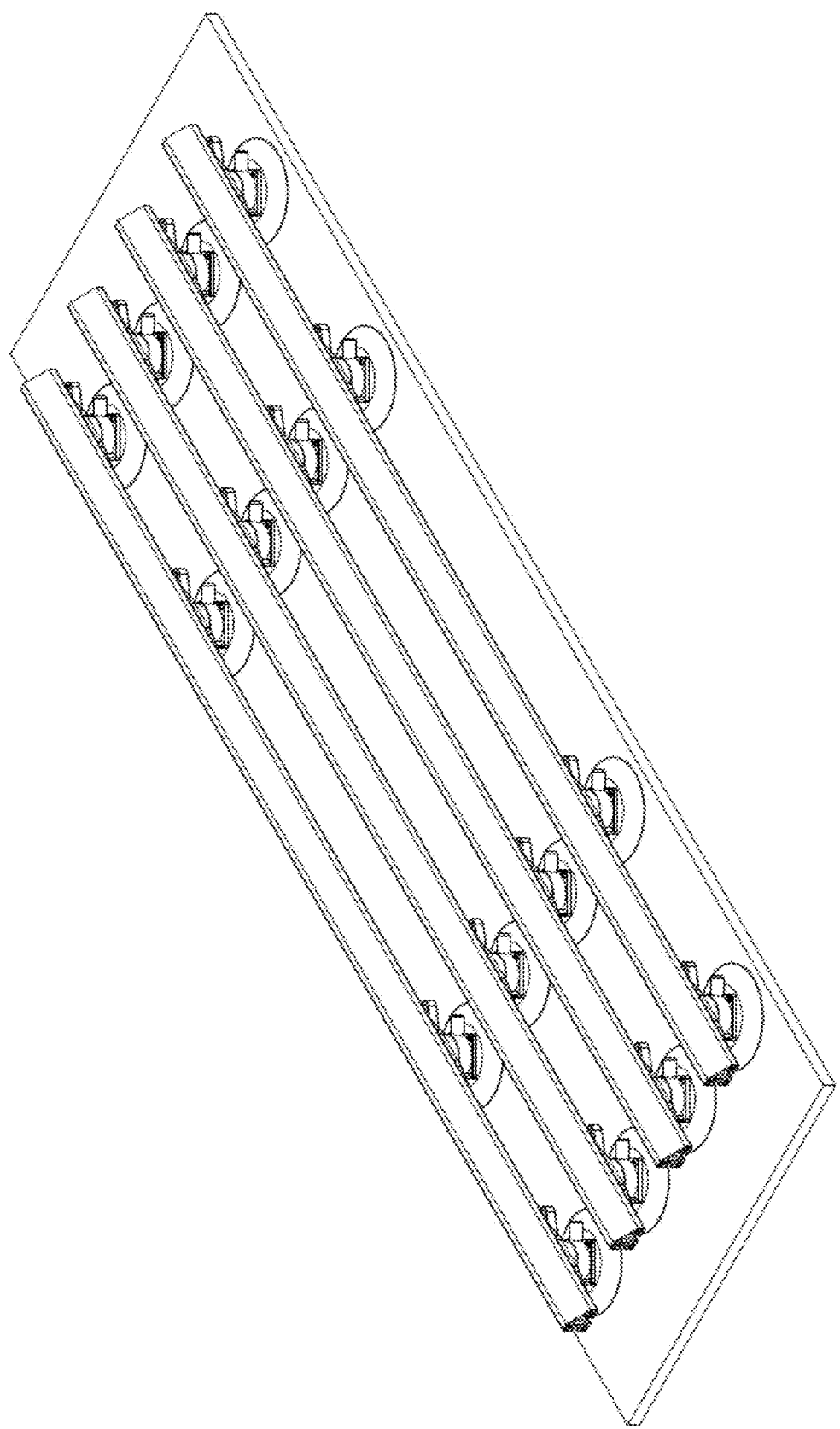
FIG. 24 illustrates a setup to test the suction power and operation of multiple suction cups.
Figure 25:
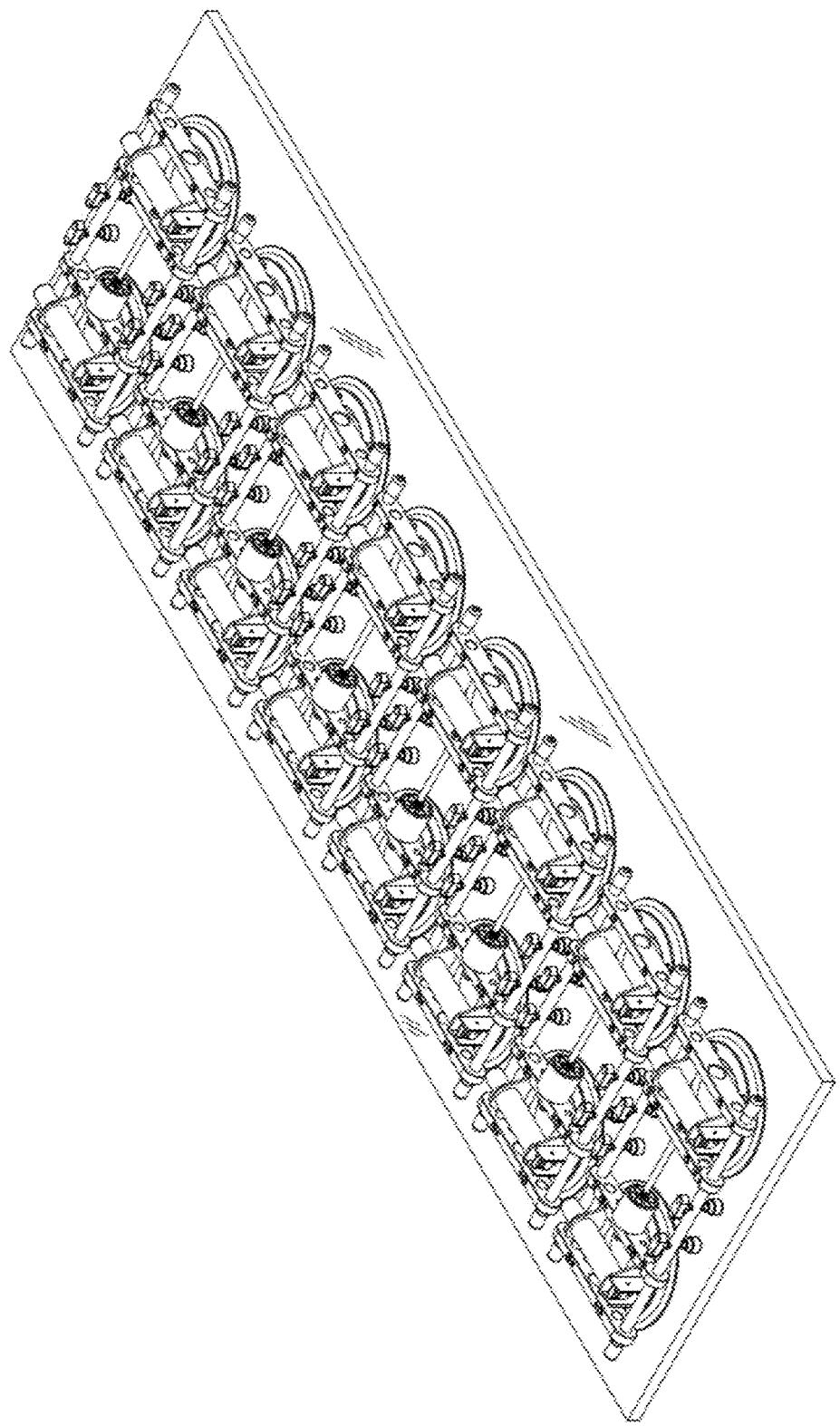
FIG. 25 illustrates a setup to test the suction power and operation of multiple suction cups.

FIGS. 23 through 25 illustrate the previous method of testing the operability of the suction cup. Prior to going to an installation site, the user would test the suction cups by placing them on a non-porous planar surface and drawing a vacuum between the cups and the surface. The suction cups that failed this test would be repaired, while those that passed could be used in the field. The user would then reapply the hard cover to the suction cup and travel to the installation site.

Because the novel suction cup cover described above does not have a hole, unlike the previous covers (see e.g. FIGS. 6-8, hole 70, gap 72), the user may employ the novel cover to test suction without resorting to use of a non-porous planar surface. Instead, the user need only apply a vacuum through the vacuum port when the suction cup cover is attached to the suction cup, and then determine whether the vacuum holds. If the vacuum does not hold, the suction cup may be disregarded. This method has many advantages over the prior art. First, it saves time because the user may simply draw a vacuum with the cover on to test. Second, the additional handling of the suction cups for testing is avoided, increasing their life expectancy. Third, since removing the cover and applying the cup to a separate non-porous planar surface increases the likelihood that the user will introduce dust and debris into/onto the suction cup, that potential for damaging the cup and further lowering its life expectancy is also avoided.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus it is to be understood that the description and drawings presented herein represent a presently-preferred embodiment of the invention and are therefore representative of the subject matter which is broadly contemplated by the present invention. It is further understood that the scope of the present invention fully encompasses other embodiments that may become obvious to those skilled in the art, and that the scope of the present invention is accordingly limited by nothing other than the appended claims.

The invention claimed is:

1. A suction cup apparatus comprising:
 a suction cup for mounting onto a work surface, the suction cup comprised of a resilient material, further comprising:
  a pliable suction surface having a bottom face;
  an outer sealing edge;
  a vacuum port constructed to allow air to be drawn from the suction cup;
 a suction cup cover comprised of a non-porous compliant material and further comprising:
  a solid suction cup cover surface having a top face;
  a suction cup cover wall extending away from the solid suction cup cover surface, wherein the suction cup cover wall is constructed to circumscribe the outer sealing edge; wherein the suction cup cover wall and solid suction cup cover surface are constructed to elastically deform under a pulling force;
 wherein when the suction cup is dismounted from the work surface, the suction cup cover is attached to the suction cup such that the pliable suction surface bottom face faces the solid suction cup cover surface top face; and the suction cup cover is constructed to fit around the sealing edge when subjected to the pulling force and further constructed to form an airtight seal between the suction cup and suction cup cover when the pulling force is withdrawn to protect the suction cup during storage.

2. The suction cup apparatus of claim 1, wherein:
 the suction cup comprises an outer wall extending away from the sealing edge and a top surface extending away from the outer wall; and
 the suction cup cover wall comprises an overhang structure constructed to extend over the top surface when the cover is attached to the cup.

3. The suction cup apparatus of claim 2, wherein the overhang structure comprises a plurality of overhang structures.

4. The suction cup apparatus of claim 2, wherein the overhang structure runs along the entire suction cup cover wall.

5. The suction cup apparatus of claim 2, wherein the overhang structure creates a dust-proof seal with the top surface.

6. The suction cup apparatus of claim 1, wherein the solid suction cup cover surface comprises strengthening ribs.

7. The suction cup apparatus of claim 1, wherein the solid suction cup cover surface comprises a foot nub.

8. The suction cup apparatus of claim 1, further comprising a pump connected to the vacuum port, wherein the pump is manually actuated or power actuated.

9. The suction cup apparatus of claim 1, the apparatus further comprising a frame connected to the suction cup, the frame comprising a manipulation structure constructed to move the suction cup, the manipulation structure selected from a group consisting of a handle, a crane and a threaded-rod linear-motion device.

10. The suction cup apparatus of claim 1, wherein the suction cup cover is constructed to withstand at least 70 kPa of vacuum applied through the vacuum port when the suction cup cover is attached to the suction cup.

11. The suction cup apparatus of claim 10, wherein the solid suction cup cover surface defines a chord that begins at one portion of the solid suction cup wall and ends at a second portion of the wall that is on the opposite side of the solid suction cup cover surface; and wherein the solid suction cup cover surface defines a plane when the suction cup is not under a vacuum; wherein the solid suction cup cover surface deflects less than 10% of the length of the chord when 70 kPa is applied through the vacuum port when the suction cup cover is attached to the suction cup.

12. The suction cup apparatus of claim 1 wherein the suction cup cover has a radius, and the solid suction cup cover surface has a thickness, wherein the ratio of the radius to the thickness is less than 80 to 1.

13. The suction cup apparatus of claim 1 wherein the suction cup cover is comprised of a thermoplastic polyurethane.

14. A method for protecting a suction cup when the suction is dismounted from a work surface, the suction cup comprised of a pliable suction surface with a bottom face, an outer sealing edge and a vacuum port constructed to allow air to be drawn from the suction cup, the method comprising:
(a) providing a suction cup cover comprised of a non-porous compliant material, a solid suction cup cover surface with a top face, a suction cup cover wall extending away from the solid suction cup cover surface, wherein the suction cup cover wall is constructed to circumscribe the outer sealing edge,
(b) attaching the suction cup cover to the suction cup such that the pliable suction surface bottom face faces the solid suction cup cover surface top face;
(c) applying a pulling force to the cover, causing the cover to elastically deform;
(d) fitting the cover around the sealing edge; and
(e) creating an airtight seal between the suction cup and suction cup cover when the pulling force is withdrawn to protect the suction cup during storage.

15. The method of claim 14 further comprising:
testing the suction cup for failure by:
applying a vacuum through the vacuum port when the suction cup cover is attached to the suction cup;
determining whether the vacuum holds; and
disregarding the suction cup if the vacuum does not hold.

16. The method of claim 15, wherein the vacuum is applied by using a manually-actuated vacuum pump or a power-actuated vacuum pump.

17. The method of claim 14, wherein the suction cup further comprises an outer wall extending away from the sealing edge and a top surface extending away from the outer wall; and the suction cup cover wall comprises an overhang, the method further comprising:
extending the overhang over the top surface when the cover is attached.

18. The method of claim 17, further comprising creating a dust-proof seal between the overhang and the top surface.

* * * * *